United States Patent [19]

Robbins et al.

[11] Patent Number: 4,956,862

[45] Date of Patent: Sep. 11, 1990

[54] METHOD OF PROVIDING SOUND PRIVACY SYSTEM COMPATIBLE WITH MONO AND BTSC STEREO AUDIO

[75] Inventors: Clyde Robbins, Maple Glen; John Schilling, Dresher, both of Pa.

[73] Assignee: General Instrument Corporation, New York, N.Y.

[21] Appl. No.: 305,785

[22] Filed: Feb. 2, 1989

[51] Int. Cl.[5] .......................... H04N 7/16; H04N 7/167
[52] U.S. Cl. ............................................. 380/19; 380/6;
 358/86; 358/143; 358/144; 455/6
[58] Field of Search ...................... 380/19, 10, 15, 6, 7;
 358/86, 197, 143, 144, 349; 455/3, 6

[56] References Cited

U.S. PATENT DOCUMENTS

| | | | |
|---|---|---|---|
| Re. 27,046 | 2/1971 | Weiss et al. | 380/19 X |
| 3,202,758 | 8/1965 | Brownstein | 380/19 X |
| 4,215,366 | 7/1980 | Davidson | 358/124 |
| 4,266,243 | 5/1981 | Shutterly | 380/19 |
| 4,402,010 | 8/1983 | Vogelman | 358/133 |
| 4,555,730 | 11/1985 | Briggs | 358/142 |
| 4,628,358 | 12/1986 | Robbins | 358/121 |
| 4,646,150 | 2/1987 | Robbins et al. | 358/144 |
| 4,821,097 | 4/1989 | Robbins | 358/143 |

Primary Examiner—Stephen C. Buczinski
Assistant Examiner—Bernarr Earl Gregory
Attorney, Agent, or Firm—Barry R. Lipsitz

[57] ABSTRACT

In order to provide secure access to the audio portion of a television signal, the audio portion of a TV signal is modulated at a frequency that is offset from the standard carrier frequency. In the embodiment disclosed herein, the audio portion of the TV signal is modulated with a nonstandard 4.75 Mhz carrier that is offset from the standard 4.5 Mhz carrier. In order that a standard TV receiver cannot receive the offset audio signal, the TV signal further contains an unmodulated carrier signal at 4.5 Mhz to "blank" unauthorized reception.

16 Claims, 3 Drawing Sheets

METHOD OF PROVIDING SOUND PRIVACY SYSTEM COMPATIBLE WITH MONO AND BTSC STEREO AUDIO

TECHNICAL FIELD OF THE INVENTION

The invention relates to television audio transmission, especially to audio transmission over a cable network.

BACKGROUND OF THE INVENTION

For standard American television transmission the intensity video information is limited to a bandwidth of 4 MHz, with the remainder of a 6 MHz channel being used for the lower vestigial sideband and the audio transmissions. The audio transmissions are modulated on a standard 4.5 MHz carrier within the channel.

It is desirable to provide a level of security in cable television transmission so that the video and/or audio segments of a transmission may only be viewed and/or heard on a premium basis by subscribers who have paid a special fee (premium) therefor.

U.S. Pat. No. 4,402,010 discloses a television signal processing and transmission system.

Commonly-owned U.S. Pat. No. 4,646,150 discloses APPARATUS AND METHOD FOR STEREO TELEVISION SOUND, and is referenced to show television audio transmission and reception techniques.

Commonly-owned U.S. Pat. No. 4,628,358 and U.S. patent application Ser. No. 022,380, filed on Mar. 5, 1987, now U.S. Pat. No. 4 821 097, describe various techniques for scrambling television transmissions, and descrambling the transmissions at the subscriber end of the cable network. These techniques, although effective, are typically complex, and relatively costly to implement.

DISCLOSURE OF THE INVENTION

An object of the invention is to provide a technique for transmitting an audio component of a television transmission in a format such that it can be received only by subscribers having special equipment, which may already be in place for other premium viewing/listening purposes. The technique of the present invention may be advantageously employed in either a "stand alone" mode, wherein it is the sole technique for providing premium audio reception, or it can be used in connection with other known techniques to provide an additional level of security for premium transmissions.

According to the invention, the audio portion of a TV signal is modulated at a frequency that is offset from the standard carrier frequency. In the embodiment disclosed herein, the audio portion of the TV signal is modulated with a 4.75 MHz carrier that is offset from the standard 4.5 MHz carrier.

In order that a standard TV receiver cannot receive the offset audio signal, the TV signal further contains an unmodulated carrier signal at 4.5 MHz.

Other objects, features and advantages of the invention will become apparent in light of the following description thereof.

The following commonly-used abbreviations (in parentheses) may be used throughout this application, including the drawings: alternating current (AC); adaptive delta modulation (ADM); audio frequency (AF); automatic gain control (AGC); amplitude modulation (AM); amplifier (AMP); bandpass filter (BPF); Broadcast Television Standards Committee (BTSC); cable television (CATV); decibel (dB); direct current (DC); Federal Communications Commission (FCC); frequency division multiplexing (FDM); horizontal frequency ($f_H$); frequency modulation (FM); intermediate frequency (IF); gain (K); kilohertz (KHz); megahertz (MHz); microprocessor ($\mu$P); modulator (MOD); National Television Standards Committee (NTSC); pulse amplitude modulation (PAM); pulse code modulation (PCM); pulse modulation (PM); pulse width modulation (PWM); quadrature phase shift keying (QPSK); radio frequency (RF); surface acoustic wave (SAW); time division multiplex (TDM); television (TV); and very high frequency (VHF).

DETAILED DESCRIPTION OF THE INVENTION

By way of background information, a standard TV signal comprises a video signal and an audio signal. The video signal occupies the first 4.25 MHz of signal bandwidth in a channel, and the audio signal is modulated at 4.5 MHz. Standard TV receivers are equipped to detect the audio signal located at 4.5 MHz within the selected TV channel.

Figure 1:
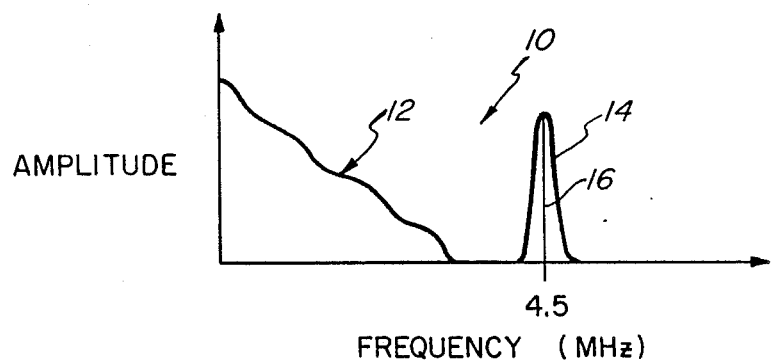
FIG. 1 is a frequency spectrum graph of a standard (prior art) television signal.

FIG. 1 shows a graph 10 of a standard, prior art television (TV) channel. The vertical axis represents signal amplitude, and the horizontal axis represents signal frequency. The video component of the TV signal is represented by a line 12, and the audio component of the TV signal is represented by a line 14. A 4.5 MHz (Megahertz) audio carrier is represented by a line 16, about which the audio signal 14 is centered.

Figure 2:
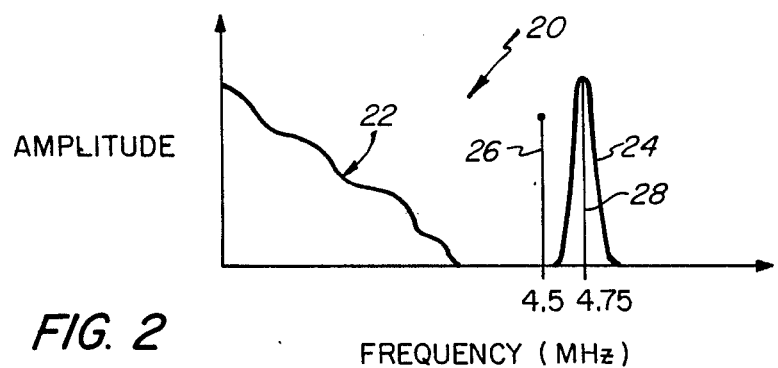
FIG. 2 is a frequency spectrum graph of a television signal according to the present invention.

FIG. 2 shows a graph 20 of a television signal transmitted according to the technique of the present invention. The vertical axis represents signal amplitude, and the horizontal axis represents signal frequency. The video component of the TV signal is represented by a line 22, and is similar to the line 12 of FIG. 1. The audio component of the TV signal is represented by a line 14, and is notably not centered about the audio carrier 26 at 4.5 MHz. Rather, the audio signal 24 is offset from the standard 4.5 MHz carrier, and is centered about 4.75 MHz. A 4.75 MHz audio carrier is represented by a line 28, about which the audio signal 24 is centered. This creates a "nonstandard" audio signal in the composite television signal transmitted, for instance over a cable TV transmission line.

As shown in FIG. 2, the standard 4.5 MHz audio carrier 26 (16 of FIG. 1) is left unmodulated. According to the present invention, the audio carrier 26 may be at slightly less than 4.5 MHz to allow more spectrum space for the audio signal, as is described in greater detail hereinafter. As an example, the unmodulated audio carrier can be inserted at a frequency as low as 4.25 MHz without interfering with the video signal of the television transmission.

At the receiving (subscriber) end, the audio signal 24 (FIG. 2) is demodulated, and then remodulated onto a standard 4.5 MHz audio FM (frequency modulation) carrier. This demodulation/remodulation is accomplished in the sound receiver of a baseband converter, described in greater detail hereinafter.

In a standard television receiver, the audio signal is detected at 4.5 MHz. Therefore, in a standard TV receiver, the unmodulated 4.5 MHz carrier (26 of FIG. 2) quiets the audio reception entirely, thereby providing an additional level of security (for premium services) at virtually no cost.

By leaving the normal sound carrier (26 of FIG. 2) present, but unmodulated at 4.5 MHz, or preferably slightly lower, as discussed hereinbefore, and FM modulating a carrier (28 of FIG. 2) at an offset frequency, preferably above 4.5 MHz, such as at 4.75 MHz, a standard NTSC TV receiver will not be able to demodulate the program audio signal.

Figure 3:
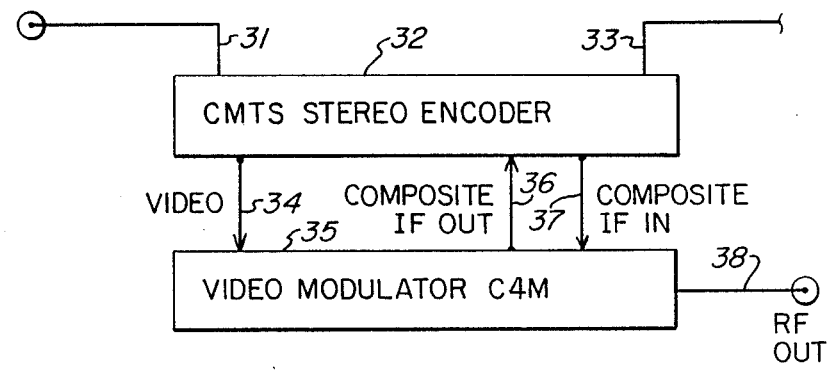
FIG. 3 is a block diagram of stereo encoder and video modulator for use in the transmission of television signals, according to the present invention.

FIG. 3 shows an embodiment of apparatus 30 for transmitting a TV signal according to the present invention. A video component of the TV signal is provided on a line 31 to a stereo encoder 32, such as a "Commander Multichannel Television Sound (CMTS)" stereo encoder available from General Instrument Co. (Jerrold Division), assignee of the present invention. An audio component of the TV signal is provided on a line 33 to the stereo encoder 32. An upconverter (not illustrated) would provide the audio signal offset from the standard frequency, for instance at 36.5 MHz rather than at 36.75 MHz. The video component of the transmitted TV signal is provided on a line 34 from the stereo encoder 32 to a video modulator 35. A suitable video modulator is the "C4M" available from General Instrument Co. (Jerrold Division). The composite (video and audio) IF output of the stereo encoder 32 is provided as an input 37 to the video modulator 35 at 45.75 MHz (video), and 41.25 MHz (unmodulated audio carrier) and 41.00 MHz (modulated audio carrier). The composite (video and audio) IF output of the video modulator is provided on a line 36 to the stereo encoder, for instance at 45.75 MHz (Video) and 41.25 MHz (Audio). The output of the video modulator 35 is provided on a line 38, such as a cable TV transmission line as an RF signal.

Figure 4:
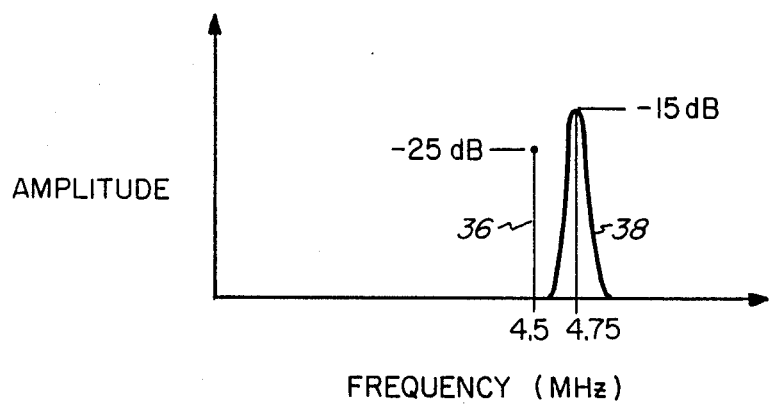
FIG. 4 is a graph of a television signal transmitted by the circuit of FIG. 3.

FIG. 4 is a graph showing the audio portion of a TV signal output from the apparatus of FIG. 3. The vertical axis is in decibels (dB), and the horizontal axis is in frequency. In a preferred embodiment of the invention, the signal level of the unmodulated sound carrier 36 (26 of FIG. 2) at 4.5 MHz is at 25 dB below the level of the picture carrier, and the signal level of the modulated audio carrier 38 (28 of FIG. 2) at 4.75 MHz is at 15 dB below the level of the picture carrier. 15 dB down is the standard level for sound carriers on a cable system. 25 dB down allows the standard TV receiver to limit on 4.5 MHz rather than 4.75 MHz.

Figure 5:
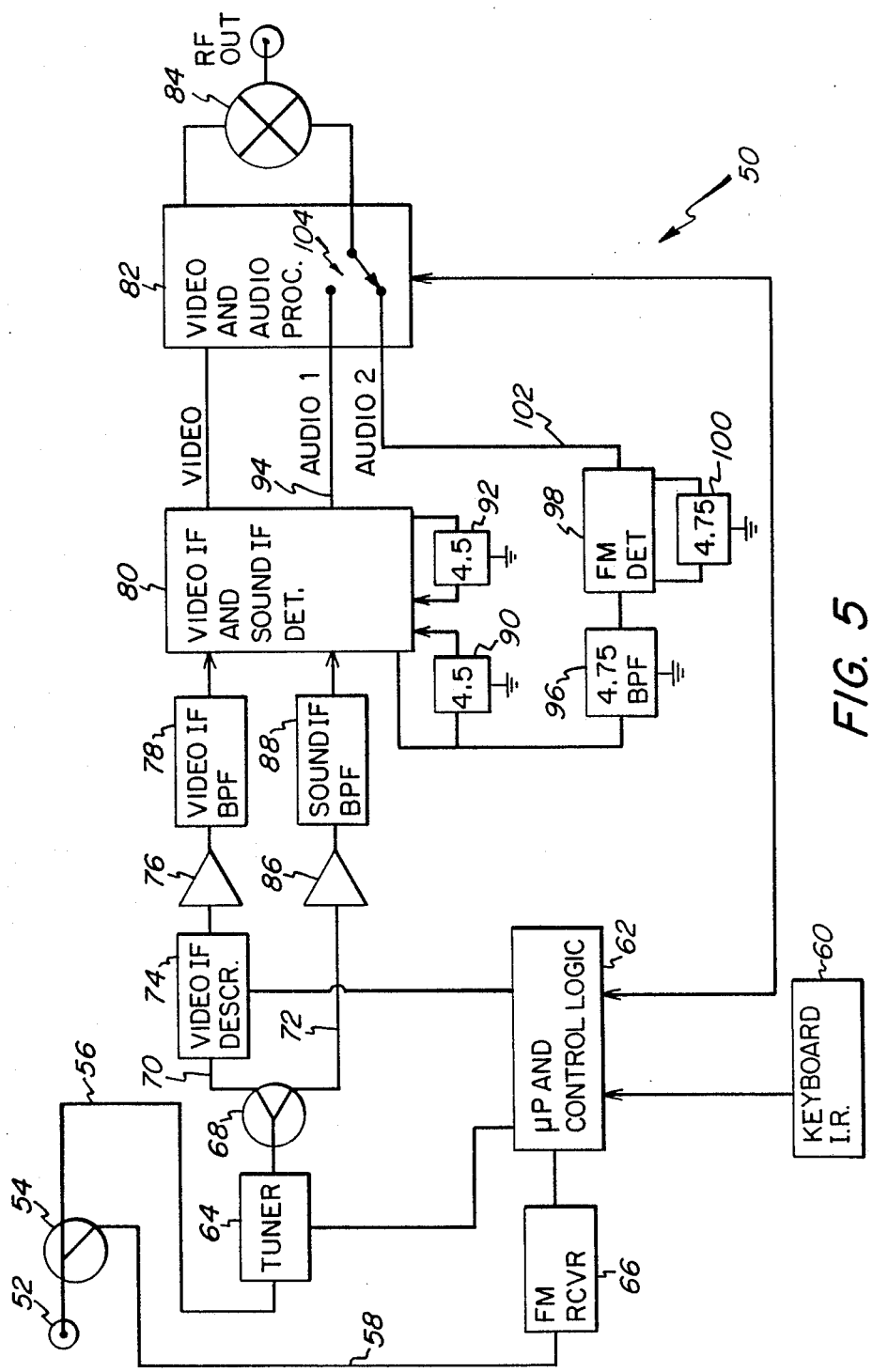
FIG. 5 is simplified block diagram of a baseband converter for receiving the television signal transmitted by the circuit of FIG. 3.

FIG. 5 shows a baseband converter 50 for receiving the signal generated by the encoder/modulator of FIG. 3.

A cable input 52 receives TV signals over the cable TV transmission line (not shown). These would include both signals transmitted with standard audio format (modulated at 4.5 MHz) and those transmitted according to the technique of this invention (modulated at 4.75 MHz and an unmodulated audio carrier at 4.5 MHz).

The signals are split by a splitter 54 onto two signal paths 56 and 58.

Channel selection is effected by a keyboard (KYBD) or infrared (I.R.) remote sensor 60 and a microprocessor (μP) 62 which exercises control over a tuner 64, all in a manner well known in the art to which this invention pertains. Premium channel service, in this case reception of the nonstandard audio signal, is effected by a signal received by an FM receiver 66, out of band, containing encoded information as to which channel tags should be enabled for reception of the nonstandard audio format. These codes are passed on to the microprocessor 62, again in a manner well known in the art to which this invention pertains.

The output of the tuner 64 is provided through a splitter 68 along two signal paths, 70 and 72.

In one path, 70, the video portion of the TV signal is treated in standard manner. First it is provided to a video IF descrambler 74, which is under control of the microprocessor 62, then it is amplified by an amplifier 76 and passed through a bandpass filter (BPF) 78 tuned to the video portion of the TV channel. As an example, the video signal at this point is at 45.75 MHz. The video signal is then provided to a Video IF and Sound IF Detector 80, such as a Mitsubishi M51365SP Quasi-parallel detector. The video signal is then passed on to a video and audio processor 82, and to a modulator 84. The RF output of the modulator 84 is provided to the user reception apparatus (television set or video recorder).

In the other path 72, the audio-portion of the TV signal is treated in a nonstandard manner. First it is amplified by an amplifier 86, and then is passed on to a bandpass filter 88 tuned to the audio portion of the TV channel. The audio signal is then provided to the Video IF and Sound IF detector 80. As an example, the content of the audio signal at this point is 41.00 MHz (modulated carrier) and 41.25 MHz unmodulated carrier, according to the technique of this invention. Or, if the television transmission is in standard format, the 41.25 MHz component is modulated. The detector 80 provides a downshifted audio signal with 4.5 MHz (unmodulated) and 4.75 MHz (modulated) components to a bandpass filter (BPF) 90 tuned to 4.5 MHz. (Or, if in standard format, 4.5 MHz modulated audio signal). In either case, standard or nonstandard transmission, the 4.5 MHz output of the bandpass filter 90 is provided to the detector 80, and discriminated by a 4.5 MHz discriminator 92. Thus, if the 4.5 MHz signal is modulated, then an audio signal will be present on the line 94. Thus, if the 4.5 MHz signal is unmodulated, then there will be no audio signal present on the line 94.

A bandpass filter 96 tuned to 4.75 MHz receives the downshifted audio signal from the detector 80, and provides the signal to a FM detector 98. A discriminator 100 set at 4.75 MHz is associated with the detector 98. The output of the detector is provided on a line 102, marked "Audio 2".

The microprocessor 62 provides a switching signal to a switch 104 in the video and audio processor to select between standard audio transmissions coming over the line 94 (Audio 1) and nonstandard audio transmissions coming over the line (Audio 2). The selected output of the switch 104 is provided as an input to the modulator 84, the output of which is a TV signal having picture and sound components at the normal 4.5 MHz picture-to-sound carrier frequency spacing.

In essence, simply by changing the band pass filter (in the example of FIG. 5, changing the BPF 96 and discriminator 100) in the sound receiver of the baseband converter to the offset frequency, e.g. 4.75 MHz, the baseband converter will receive and demodulate the desired program audio. The demodulated audio signal is used to modulate the internal 4.5 MHz FM modulator so that the RF (radio frequency) output of the baseband converter is provided in standard NTSC (or BTSC for stereo audio) format for reception at the viewers TV set.

What is claimed is:

1. A method for providing an audio signal in an approximately 6 MHz radio frequency channel of a television signal, said method comprising the steps of:
   generating a video signal having an approximately 4.25 MHz bandwidth for inclusion in said channel;
   generating an audio signal;
   generating a first, unmodulated carrier signal at approximately 4.5 MHz for inclusion in said channel;
   generating a second carrier signal offset in frequency from the first carrier signal for inclusion in said channel; and
   modulating the second carrier signal with the audio signal; wherein:
   the video signal includes a picture carrier having a signal level;
   the first, unmodulated carrier is at a signal level below the level of the video signal; and
   the second carrier is at a signal level between the level of the video signal and the level of the first, unmodulated carrier.

2. A method according to claim 1, wherein the second carrier signal is at a frequency of approximately 4.75 MHz within the channel.

3. A method according to claim 1, wherein: the level of the picture carrier is 0 dB;
   the level of the first unmodulated carrier is approximately 25 to 30 dB below the level of the picture carrier; and
   the level of the second carrier is approximately 15 dB below the level of the picture carrier.

4. A method of receiving a TV signal generated according to claim 1, comprising:
   receiving the audio signal on the second carrier;
   demodulating the audio signal from the second carrier;
   generating a third carrier signal at approximately 4.5 MHz; and
   modulating the third carrier signal with the audio signal for provision to a TV set.

5. A method for providing reception of a television audio signal transmitted at a nonstandard audio carrier frequency, comprising the steps of:
   receiving a television signal including:
      a picture carrier having a signal level,
      an unmodulated standard audio carrier having a signal level below the level of the picture carrier, and
      a modulated nonstandard audio carrier at a signal level between the level of the picture carrier and the level of the unmodulated standard audio carrier; and
   translating said nonstandard audio carrier to a standard audio carrier frequency for reception by a conventional television receiver.

6. A method according to claim 5 comprising the further step of:
   translating said nonstandard audio carrier to said standard audio carrier frequency only if authorized by a prior authorization signal.

7. A method according to claim 5 wherein:
   the level of the picture carrier is 0 dB;
   the level of the standard audio carrier is approximately 25 to 30 dB below the level of the picture carrier; and
   the level of the nonstandard audio carrier is approximately 15 dB below the level of the picture carrier.

8. A method according to claim 5 wherein said translating step comprises the steps of:
   demodulating said nonstandard audio carrier; and
   remodulating the demodulated carrier onto said standard audio carrier frequency.

9. Converter apparatus for enabling a conventional television receiver to reproduce a television audio signal transmitted at a nonstandard audio carrier frequency comprising:
   means for receiving a television channel signal from a cable television network or the like; and
   means coupled to said receiving means for translating an audio portion of said signal at a nonstandard audio carrier frequency to a standard audio carrier frequency for input to a conventional television receiver; wherein the television channel signal includes:
   a picture carrier having a first signal level,
   a standard audio carrier having a signal level below the level of the picture carrier, and
   a modulated nonstandard audio carrier at a signal level between the level of the picture carrier and the level of the standard audio carrier.

10. Converter apparatus in accordance with claim 9 further comprising:
    means for receiving authorization data from said cable television network; and
    means responsive to said authorization data for providing the translated audio portion at said standard audio carrier frequency only when authorized.

11. Converter apparatus in accordance with claim 10 wherein the means responsive to said authorization data comprise a switch for inputting said translated audio portion to said television receiver when authorized, and for inputting a standard audio carrier contained in said television channel signal to said television receiver when not authorized.

12. Converter apparatus in accordance with claim 11 wherein the standard audio carrier contained in said television channel signal is unmodulated.

13. Converter apparatus in accordance with claim 9 wherein said standard audio carrier frequency is at 4.5 MHz within a 6 MHz wide television channel signal.

14. Converter apparatus in accordance with claim 13 wherein said nonstandard audio carrier frequency is at approximately 4.75 MHz within a 6 MHz wide television channel signal.

15. Converter apparatus in accordance with claim 9 wherein said television channel signal picture carrier comprises a video portion and said translating means combines said audio and video portions into a standard composite RF television channel signal for input to said television receiver.

16. Converter apparatus in accordance with claim 9 wherein said translating means comprises:
    means for demodulating the audio portion of said signal received at said nonstandard audio carrier frequency; and
    means for remodulating said audio portion onto said standard audio carrier frequency.

* * * * *